United States Patent
Franzen et al.

(10) Patent No.: US 9,940,297 B2
(45) Date of Patent: Apr. 10, 2018

(54) METHOD FOR MANIPULATING THE BUS COMMUNICATION OF A CONTROL DEVICE

(71) Applicant: dSPACE digital signal processing and control engineering GmbH, Paderborn (DE)

(72) Inventors: Ortwin Ludger Franzen, Bad Lippspringe (DE); Ralf Stolpe, Hoevelhof (DE); Ulrich Kiffmeier, Harsewinkel (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 309 days.

(21) Appl. No.: 13/900,008

(22) Filed: May 22, 2013

(65) Prior Publication Data

US 2013/0326098 A1 Dec. 5, 2013

Related U.S. Application Data

(60) Provisional application No. 61/655,658, filed on Jun. 5, 2012.

(30) Foreign Application Priority Data

Jun. 5, 2012 (DE) .......................... 10 2012 104 842
Jun. 5, 2012 (EP) ............................... EP12170769

(51) Int. Cl.
*G06F 13/42* (2006.01)
(52) U.S. Cl.
CPC ................................ *G06F 13/4286* (2013.01)
(58) Field of Classification Search
CPC .................................................. G06F 13/4286
(Continued)

(56) References Cited

U.S. PATENT DOCUMENTS 5,363,137 A * 11/1994 Suga et al. ..................... 348/302
5,418,963 A *  5/1995 Anezaki et al. ............... 717/117
(Continued)

FOREIGN PATENT DOCUMENTS

DE    10 2007 048 860 A1    5/2008
JP         H 03-66242 A       3/1991
(Continued)

OTHER PUBLICATIONS

Overview of the Hardware Abstraction Layer, Altera Corporation, 2011.*

(Continued)

*Primary Examiner* — Idriss N Alrobaye
*Assistant Examiner* — Brooke Taylor
(74) *Attorney, Agent, or Firm* — Muncy, Geissler, Olds & Lowe, P.C.

(57) ABSTRACT

A method for manipulating the bus communication of an electronic control device is provided, wherein the bus communication includes a bus hardware-independent first communication layer and a bus hardware-dependent second communication layer. The first communication layer encodes at least one piece of information in a first protocol data unit and transmits it to the second communication layer and/or the first communication layer receives the first protocol data unit from the second communication layer and decodes the first information from the first protocol data unit. The second communication layer generates bus hardware-dependent bus information from the first protocol data unit or from an additional protocol data unit derived from the first protocol data unit for transmission via the bus and/or the second communication layer generates the first protocol data unit or an additional protocol data unit, from which the first protocol data unit can be derived.

1 Claim, 10 Drawing Sheets

(58) Field of Classification Search
USPC ............... 710/305, 105; 701/1; 718/328; 370/403; 714/35
See application file for complete search history.

(56) References Cited

U.S. PATENT DOCUMENTS

| | | | |
|---|---|---|---|
| 5,850,388 A * | 12/1998 | Anderson et al. | 370/252 |
| 6,345,042 B1 * | 2/2002 | Musial | 370/241 |
| 6,968,544 B1 * | 11/2005 | Schneider | 717/146 |
| 7,408,883 B2 * | 8/2008 | Deragon et al. | 370/249 |
| 8,402,388 B2 * | 3/2013 | Ehrhardt et al. | 715/798 |
| 8,407,388 B2 | 3/2013 | Bayerl et al. | |
| 2002/0157041 A1 * | 10/2002 | Bennett et al. | 714/43 |
| 2002/0186697 A1 * | 12/2002 | Thakkar | 370/401 |
| 2003/0226065 A1 | 12/2003 | Shingaki | |
| 2004/0257984 A1 * | 12/2004 | Johnson et al. | 370/221 |
| 2008/0037435 A1 * | 2/2008 | Sankala | 370/250 |
| 2009/0116490 A1 * | 5/2009 | Charpentier et al. | 370/395.1 |
| 2009/0240857 A1 * | 9/2009 | Hartwich | G06F 13/4286 710/107 |
| 2010/0013682 A1 * | 1/2010 | Abdul Kader Jailani | 341/79 |
| 2010/0161859 A1 * | 6/2010 | Brandt et al. | 710/105 |
| 2010/0292867 A1 * | 11/2010 | Bohm et al. | 701/1 |
| 2011/0099426 A1 * | 4/2011 | Jibbe et al. | 714/35 |
| 2012/0096477 A1 * | 4/2012 | Lee et al. | 719/328 |
| 2013/0246851 A1 | 9/2013 | Goto | |

FOREIGN PATENT DOCUMENTS

| | | |
|---|---|---|
| JP | H 06-19738 A | 1/1994 |
| JP | H 08-181707 A | 7/1996 |
| JP | 2000-183927 A | 6/2000 |
| JP | 2003-348105 A | 12/2003 |
| JP | 2010-507304 A | 3/2010 |
| WO | WO 2012/066636 A1 | 5/2012 |

OTHER PUBLICATIONS

Xgig 10 Gigabit Ethernet and Fibre Channel Analyzer, Finisar Corporation, 2007.*
Japanese Office Action for Japanese Application No. 2013-119150 dated Jun. 30, 2014 with English translation.
Extended European search report & machine translation.
Hillenbrand M et al.: "An approach to supply simulations of the functional environment of ECUs for hardware-in-the-loop test systems based on EE-architectures conform to AUTOSAR"; Rapid System Prototyping, 2009, RSP' 09. IEEE/IFIP International Symposium on, IEEE, Piscataway, NJ, Jun. 23, 2009, pp. 185-195.
Patrick E Lanigan et al.: "Experiences with a CANoe-based Fault Injection Framework for AUTOSAR"; Dependable Systems and Networks (DSN), 2010 IEEE/IFIP International Conference on, IEEE, Piscataway, NJ, USA, Jun. 28, 2010, pp. 569-574.
"Virtual ECU Testing" 2 Pages from www.dspace.com; published on Jan. 2012.
"SystemDesk for developing complex system architectures", pp. 44-65; Catalog 2012 dSPACE GmbH.
"Funktionale Verifikation von AUTOSAR-Softwarearchitekturen"; Automotive Aug. 7, 2011, Engineering Tools; pp. 36-38.
"Specification of PDU Router", AUTOSAR GbR; Feb. 2, 2010; pp. 1-115; V2.2.2; Document ID 035.
"VolcanoTM VSI Virtual System Integrator" Vehicle Systems Design, www.mentor.com/vnd ; Apr. 2009.
Bill Chown et al. "Autosar: detecting design flaws early on", Aug. 16, 2010; pp. 1-4; eetindia.com| EE Times-India.

* cited by examiner

Prior Art

METHOD FOR MANIPULATING THE BUS COMMUNICATION OF A CONTROL DEVICE

This nonprovisional application claims priority to German Patent Application No. DE 10 2012 104 842.8, which was filed in Germany on Jun. 5, 2012, to European Patent Application No. EP 12170769.9, which was filed on Jun. 5, 2012, and to U.S. Provisional Application No. 61/655,658, which was filed on Jun. 5, 2012, and which are all herein incorporated by reference.

BACKGROUND OF THE INVENTION

Field of the Invention

The invention relates to a method for manipulating a bus communication of a control device, whereby the bus communication includes at least one bus hardware-independent first communication layer and at least one bus hardware-dependent second communication layer.

Description of the Background Art

Methods for manipulating the bus communication of a control device are often used when a control device, which is connected or to be connected to other communication partners via a bus, is to be tested, particularly when the communication behavior of the control device itself is the object of the test. Methods for manipulating the bus communication of a control device are often used for this reason to test a control device and for testing the control device behavior in the event of error. Such methods are known, for example, as part of the so-called restbus simulation, in which real control devices are used in a hardware- and software-based simulated communication environment and their behavior is tested. Such methods are also known, however, as part of the restbus simulation of virtual control devices.

The first and the second communication layer can comprise additional sub-communication layers. The term "communication layer" is to be understood here substantially in the same sense as it is used, according to general understanding, for network protocols or bus protocols. Each communication layer typically provides functionalities to receive information from an adjacent communication layer and to pass it on prepared to another adjacent communication layer. With respect to the aforementioned division into a bus hardware-independent first communication layer and a bus hardware-dependent second communication layer, this means specifically that the first communication layer encodes at least one piece of information in a first protocol data unit and transmits it to the second communication layer and/or that the first communication layer receives the first protocol data unit from the second communication layer and decodes the information from the first protocol data unit. Information in the bus hardware-independent first communication layer refers here typically to an application-oriented datum, for example, a measured value, which has been recorded by the control device and is sent via a bus to another bus participant, or, for example, a variable calculated by the control device. The specific bus used in the particular case is not important for the methods being discussed either in the state of the art or in the method of the invention; the method can be used with any data buses. Examples of bus standards often used in industrial practice are CAN, LIN, or FlexRay. The information is encoded in the send direction, therefore from the first communication layer to the second communication layer, this means, for example, expanded by certain administrative information, and forwarded further to layers closer to the bus and in the present case, therefore, to the second communication layer. In the send and encode direction, the information is packed in the aforementioned protocol data unit. In the receive or decode direction, administrative information is correspondingly removed from the packed information, therefore the first protocol data unit, and finally the information is provided as such. If the first communication layer is capable of both sending and receiving, both the functionality of encoding and the functionality of decoding are implemented. The first communication layer for this reason is bus hardware-independent, because only such services are implemented in it that are independent of the specific bus hardware. In other words, the services realized in the bus hardware-independent layer are either independent of the bus system or dependent on the bus system, but not dependent on the specific bus hardware. The bus-independent first communication layer therefore lies above the communication hardware abstraction layers. For the example of a control device realized according to the AUTOSAR standard, the bus hardware-independent first communication layer then comprises application layer, runtime environment (RTE), and communication services (also including bus system-dependent parts, such as, e.g., CAN transport protocol or FlexRay transport protocol), but not the bus hardware-dependent driver layers, such as, e.g., CAN interface or FlexRay interface.

The bus hardware-dependent second communication layer as well comprises functionalities that realize the transmission of data in the send direction, therefore in the direction to the bus, or in the receive direction, therefore in the direction to the first communication layer, or the transmission of data in both directions. This means that the second communication layer generates bus hardware-dependent bus information from the first protocol data unit or from an additional protocol data unit derived from the first protocol data unit for transmission via the bus (send direction), and/or that the second communication layer generates the first protocol data unit or an additional protocol data unit, from which the first protocol data unit can be derived (receive direction), at least from a bus hardware-dependent bus information. Apart from the first protocol data unit, accordingly there can also be additional protocol data units, which are either derived from the first protocol data unit or from which the first protocol data unit can be derived. This takes into account only the fact that the second communication layer can comprise a plurality of sub-communication layers or protocol layers, each of which generates its corresponding protocol data unit, as has been explained in regard to the first protocol data unit. In the send direction, additional administrative information is typically added to each additional protocol data unit and in the receive direction the additional protocol data units are extracted in sub-communication layers or protocol layers until ultimately the first protocol data unit is obtained, from which the information is ultimately obtained in the first communication layer.

During the testing of control devices and the bus communication of control devices, there is interest in carrying out the testing as realistically as possible in order to obtain as meaningful a test result as possible. In regard to the control device this condition can be met in that in a testing environment merely the control device is used that corresponds in every respect to the series control device to be used later, which therefore has series hardware as well as series software.

For the testing of a real control device, other communication partners are frequently emulated within the scope of a restbus simulation on a hardware-in-the-loop simulator (HIL simulator), whereby not all communication partners need to be simulated, and some of the other communication partners can also be actually present. In the case of this restbus simulation also present in any event, errors can be generated relatively simply in the simulated restbus part, but errors cannot be simply injected between actually present control devices. If the communication between real control devices is to be manipulated as well, this is often realized with an error gateway. In an error gateway, in addition to the normal bus operating fault-free, a second "error bus" is provided, which in the case of error takes effect between two real control devices. The error gateway then mediates between the normal bus and the error bus, whereby the error gateway receives and decodes the data to be manipulated in the error case to be tested until such a protocol data unit is present in which an error is to be introduced, after which the manipulated message is again encoded and supplied to another control device via the error bus. It is readily evident that the manipulating of the bus communication of a control device via an error gateway is decidedly costly. Moreover, the restbus simulation with real control devices always requires that the control device is present also in its series version or at least as a hardware realization (so-called pre-series); this makes testing of the bus communication of a control device at an earlier time virtually impossible. Another fact is that the code, later used in the actual control devices, is not implemented in the restbus model of a simulated control device on an HIL simulator, so that the manipulated and tested bus communication does not correspond to the later actually realized bus communication.

The so-called virtual control devices initiate the testing exactly here. In contrast to the control device model of a restbus simulation, the code of a virtual control device already contains components of the series control device code, which is to be used later in the control device hardware.

Software that emulates a real control device in a simulation scenario is therefore called a virtual control device. The virtual control device in this case comprises, for example, the component of the application software, the runtime environment, and parts of the basic software as a serial control device code.

A virtual control device model is tested, for example, on a standard PC in an offline simulation or on a real-time simulator. In this regard, realistic effects such as the communication behavior are to be analyzed in the simulation.

SUMMARY OF THE INVENTION

It is therefore an object of the present invention to provide a method for manipulating the bus communication of a control device, the method allows the most possible realistic testing of the bus communication of the control device.

In an embodiment, it is provided that at least one send manipulation layer, realized either between the first communication layer and the second communication layer or within the second communication layer, manipulates the first protocol data unit and/or at least one additional protocol data unit derived from the first protocol data unit and provides the manipulated first protocol data unit and/or the manipulated additional protocol data unit to the second communication layer for further processing and/or in that at least one receive manipulation layer, realized either between the first communication layer and the second communication layer or within the second communication layer, manipulates the additional protocol data unit or the first protocol data unit derived from the additional protocol data unit and provides the obtained manipulated first protocol data unit and/or the manipulated additional protocol data unit to the second communication layer for further processing.

An aspect of the method of the invention is that, apart from the bus hardware-independent first communication layer, a send manipulation layer (send direction) and/or a receive manipulation layer (receive direction) are provided; this enables manipulation of the data to be sent or received virtually at any depth of the protocol stack. Because the manipulation layers are provided in each case outside the bus hardware-independent first communication layer, the control device code underlying the first communication layer can be tested unchanged also in an error injection via the manipulation layers. The code of the bus hardware-independent first communication layer need not be changed in any way for the error injection according to the invention by the manipulation layers; therefore it also need not be generated anew. Because the bus hardware-independent first communication layer in real applications typically comprises an application layer, a layer for implementing a runtime environment, and a sub-communication layer comprising specific bus hardware-independent communication services, particularly the unchanged bus hardware-independent communication services as well are tested with the method of the invention during the manipulation of the bus communication; this represents a considerable advantage compared with methods known from the state of the art.

It is not critical for the method of the invention whether the send manipulation layer and/or the receive manipulation layer are realized between the bus hardware-independent first communication layer and the bus hardware-dependent second communication layer, therefore virtually outside the first and the second communication layer, or whether the receive and/or send manipulation layer are realized as part of the second communication layer. Depending on the application and according to the desired site of manipulating the bus communication, it may also be desired to realize one or both manipulation layers both between the first communication layer and the second communication layer and also within the second communication layer.

In an embodiment of the method, the first protocol data unit and/or at least one additional protocol data unit derived from the first protocol data unit can be manipulated by the send manipulation layer, in that the first protocol data unit and/or the additional protocol data unit are decoded, the obtained decoded information to be manipulated is manipulated, and the manipulated information is again encoded into a manipulated first protocol data unit and/or into a manipulated additional protocol data unit. Primarily when the second communication layer comprises a plurality of sub-communication layers (also protocol layers), additional protocol data units, which are derived from the first protocol data unit and each of which is provided with additional and protocol-dependent information in the direction toward the sub-communication layers near the bus, appear in the second communication layer.

In correspondence to the aforementioned exemplary embodiment, another exemplary embodiment of the manipulation method is that the receive manipulation layer manipulates the additional protocol data unit and/or the first protocol data unit derived from the additional protocol data unit, in that the additional protocol data unit and/or the first protocol data unit are decoded, the obtained decoded information to be manipulated is manipulated, and the manipulated information is again encoded into the manipulated first protocol data unit and/or the manipulated additional protocol data unit. Just as already explained in regard to the send manipulation layer, the first protocol data unit or the additional protocol data unit is unpacked until the data to be manipulated "are exposed" and therefore accessible to being manipulated, after which the manipulated data are again "packed" by encoding and again supplied to the data flow of the bus communication. Manipulations or error injections to be carried out relate, for example, to the canceling and/or a delay of the transmission of protocol data units, the canceling or delay of a receipt acknowledgement, and the manipulation of raw data, update bits, check sums, counters, and signals/data.

In another embodiment of the manipulation method, a plurality of protocol data units for a plurality of protocol layers can be generated from the first protocol data unit and/or in a plurality of protocol layers the first protocol data unit is derived from a plurality of protocol data units. In so doing, a plurality of send and/or receive manipulation layers perform a plurality of manipulations on a plurality of protocol data units between a plurality of protocol layers. If this occurs within the second communication layer, then the mentioned protocol layers are virtually sub-communication layers within the second communication layer. Examples of protocol layers within the second communication layer, therefore of sub-communication layers within the second communication layer, are a hardware abstraction layer and a hardware driver layer, whereby the send manipulation layer and/or the receive manipulation layer are realized, for example, between the hardware abstraction layer and the hardware driver layer. Additional manipulation layers can be realized additionally or alternatively.

The method of the invention for manipulating the bus communication of a control device can be used without hesitation in association with already existing standards. A preferred application is that the bus hardware-independent first communication layer is implemented according to the Automotive Open System Architecture (AUTOSAR), which is designed to effect a separation between the application and the underlying hardware.

The method of the invention has the advantage that virtually any testing scenario with the retention of the described advantages can be realized with its use. The method can be carried out easily, for example, by means of a software implementation in a control device, particularly in a series control device. In such a software implementation, the code underlying the first bus hardware-independent communication layer can remain unaffected; the series control device need only be instrumented insofar as that the send manipulation layer and/or the receive manipulation layer must be provided between the first communication layer and the second communication layer and/or within the second communication layer. Particularly communication services provided within the first communication layer are tested independent of the send manipulation layer and/or the receive manipulation layer.

A series control device is not required, however, to carry out the manipulation method of the invention. In a preferred application, the manipulation method of the invention is carried out by means of software implementation on an emulated control device, particularly, for example, on a control device emulated by means of a hardware-in-the-loop simulator in real time. It should be emphasized in particular here also that the code underlying the first bus hardware-independent communication layer, as it is used later in the final target hardware, is also used in an emulated control device and is tested there virtually separate from the implemented manipulation layers.

The method of the invention can be carried out readily also completely offline, therefore by means of a software implementation on a target computer, which particularly is not real-time-capable. Here as well, the code of the first communication layer with the communication services contained therein again can be used readily as it is used later in the final hardware.

Another embodiment of the method provides that the first communication layer and/or the second communication layer and/or the send manipulation layer and/or the receive manipulation layer can be carried out on different computer units, particularly on different processors or on different processor cores.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 6:
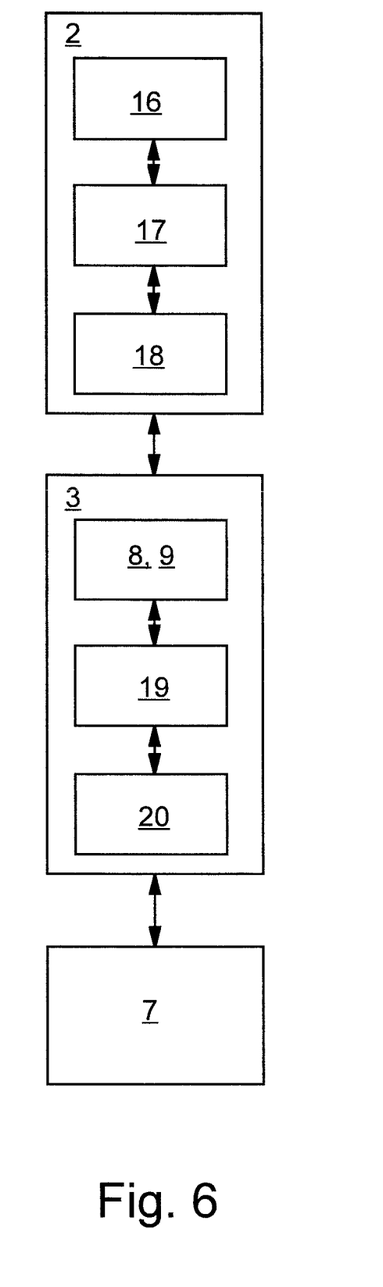
FIG. 6 shows the bus hardware-dependent second communication layer with a plurality of protocol layers as sub-communication layers.
Figure 7:
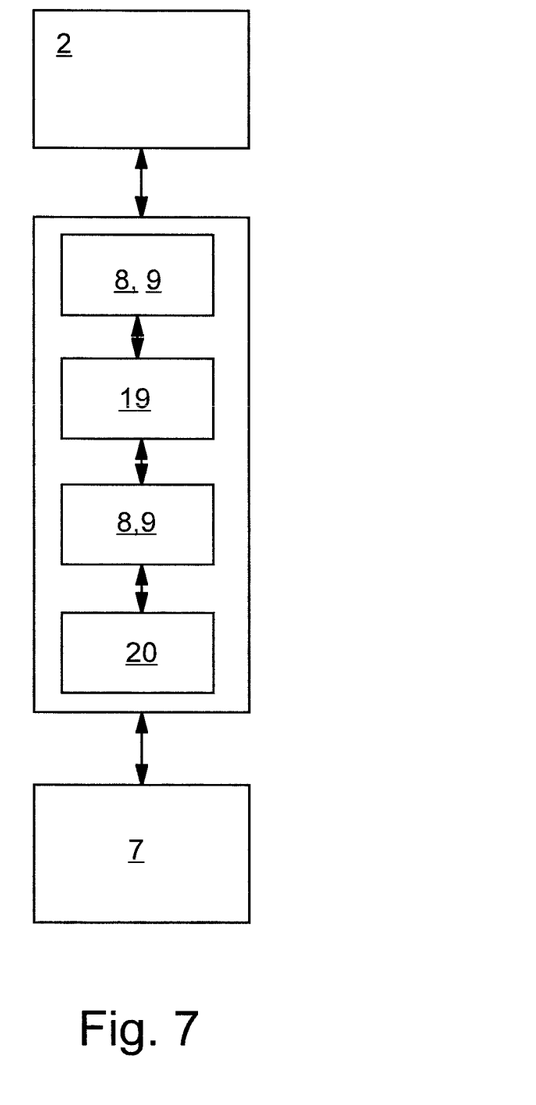
FIG. 7 shows the bus hardware-dependent second communication layer with a plurality of send and receive manipulation layers.
Figure 8:
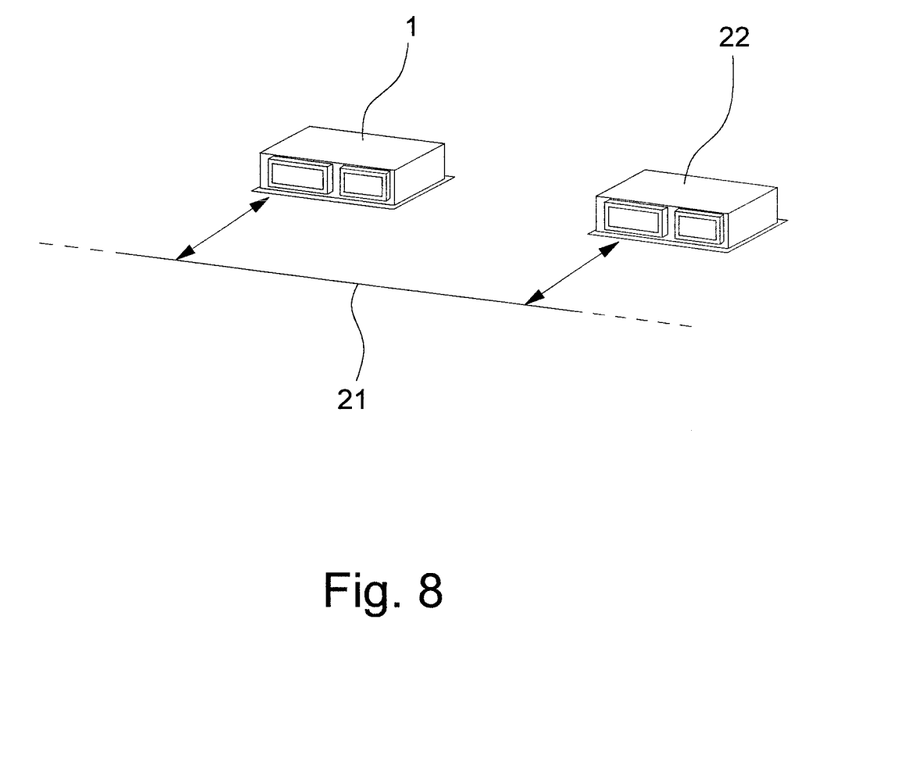
FIG. 8 shows the use of the manipulation method with series control devices in the field.
Figure 9:
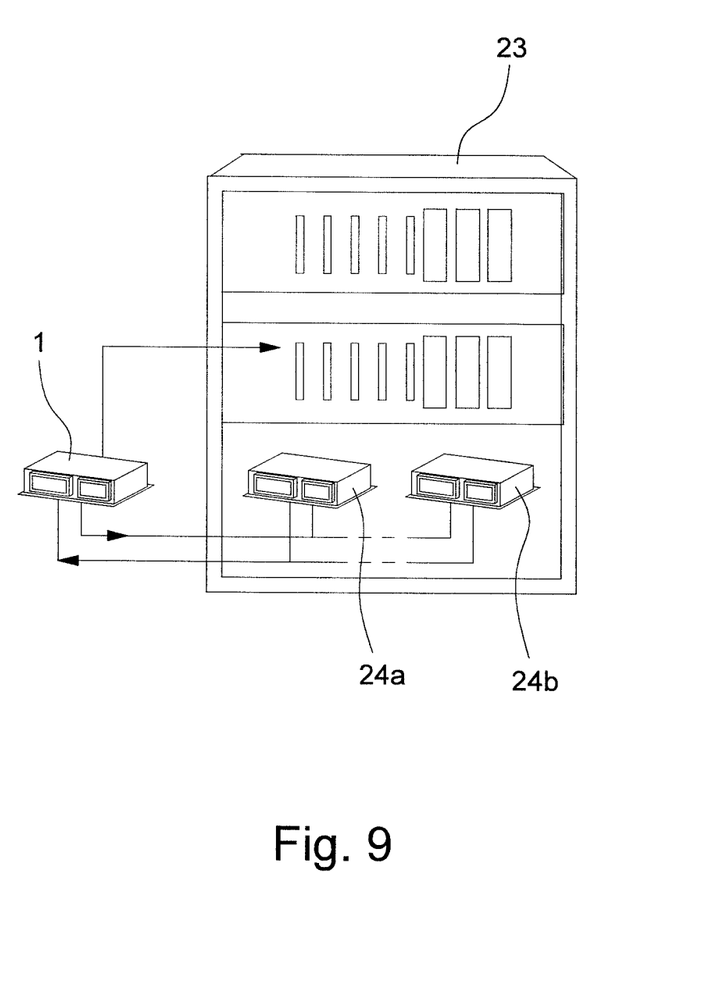
FIG. 9 shows the use of the manipulation method in a control device with restbus simulation.
Figure 10:
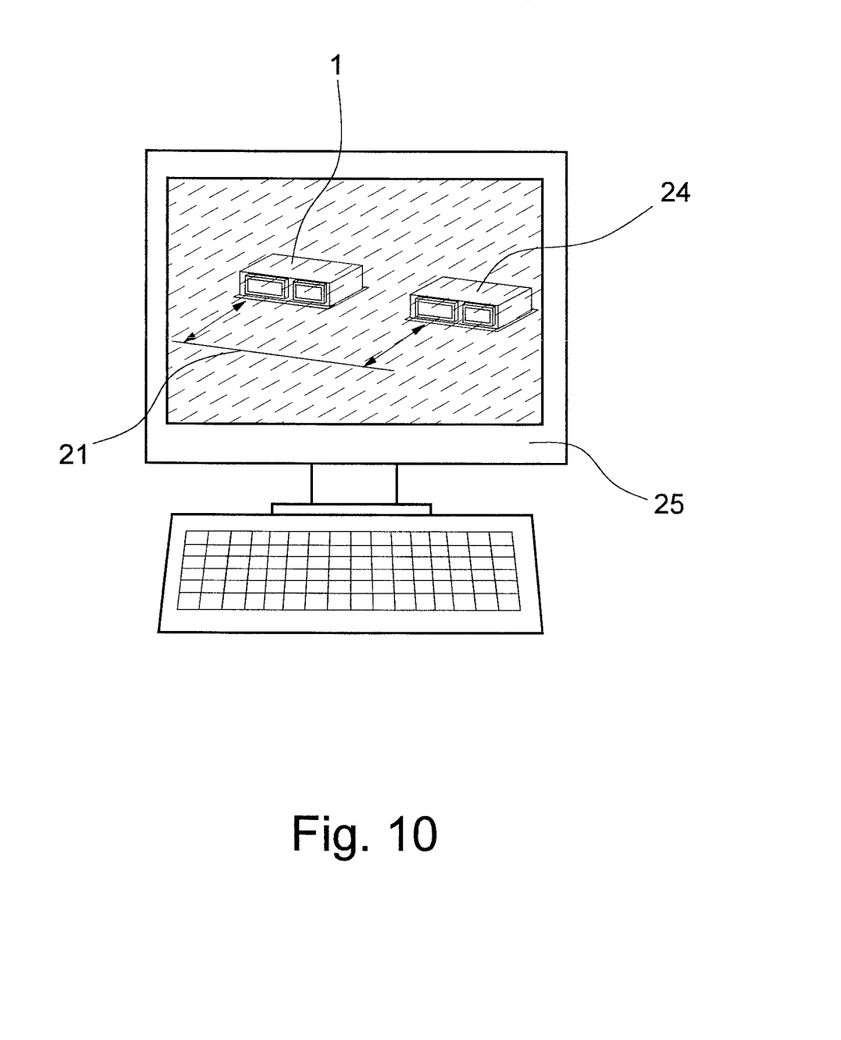
FIG. 10 shows the use of the manipulation method "offline" in a non-real-time-capable PC.

Different aspects of a method for manipulating the bus communication of a control device 1 are shown in FIGS. 1 to 10, whereby a real control device 1 is shown explicitly only in FIGS. 8 and 9, and FIG. 10 shows a simulated control device 1.

Figure 1:
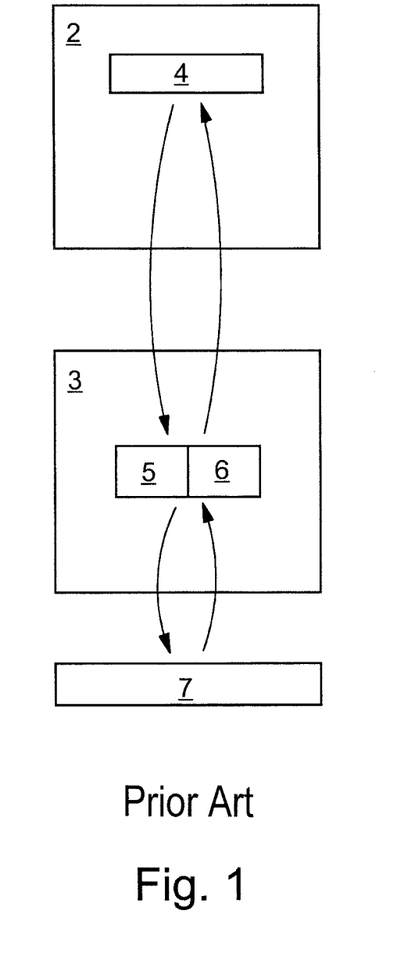
FIG. 1 shows schematically the operation of the bus communication of a control device according to the prior art.

In FIG. 1 the structure of a bus communication known from the state of the art is shown schematically, which comprises a bus hardware-independent first communication layer 2 and a bus hardware-dependent second communication layer 3. The bus hardware-independent first communication layer 2 encodes information 4 in a first protocol data unit 5 and transmits this to bus hardware-dependent second communication layer 3. Conversely, on the "receiver side," first communication layer 2 receives first protocol data unit 5 from second communication layer 3 and in turn decodes information 4 from first protocol data unit 5. Information 4 is typically application-specific information, for example, a process variable such as pressure or temperature, a setpoint for a control element incorporated by the control device or connected to the control device, or perhaps also only information to be displayed. Information 4 is usually bus hardware-independent.

In the send direction, bus hardware-dependent bus information 7 is generated by the second communication layer 3 from first protocol data unit 5 or from an additional protocol data unit 6 derived from first protocol data unit 5, for later transmission via the bus. In the receive direction, this means that second communication layer 3 generates first protocol data unit 5 or an additional protocol data unit 6, from which first protocol data unit 5 can be derived, from bus hardware-dependent bus information 7. First communication layer 2 and second communication layer 3 can be subdivided into further sub-communication layers; therefore they can contain for their part a plurality of protocol layers. In the send direction, therefore from first communication layer 2 via second communication layer 3 to bus information 7, information 4 during traversal through the protocol stack is wrapped in an increasing number of protocol informations. In the receive direction, therefore from bus information 7 via second communication layer 3 to first communication layer 2, bus information 7 during the reverse traversal through the protocol stack is always further stripped of protocol information, until finally only information 4 is still present.

Figure 2:
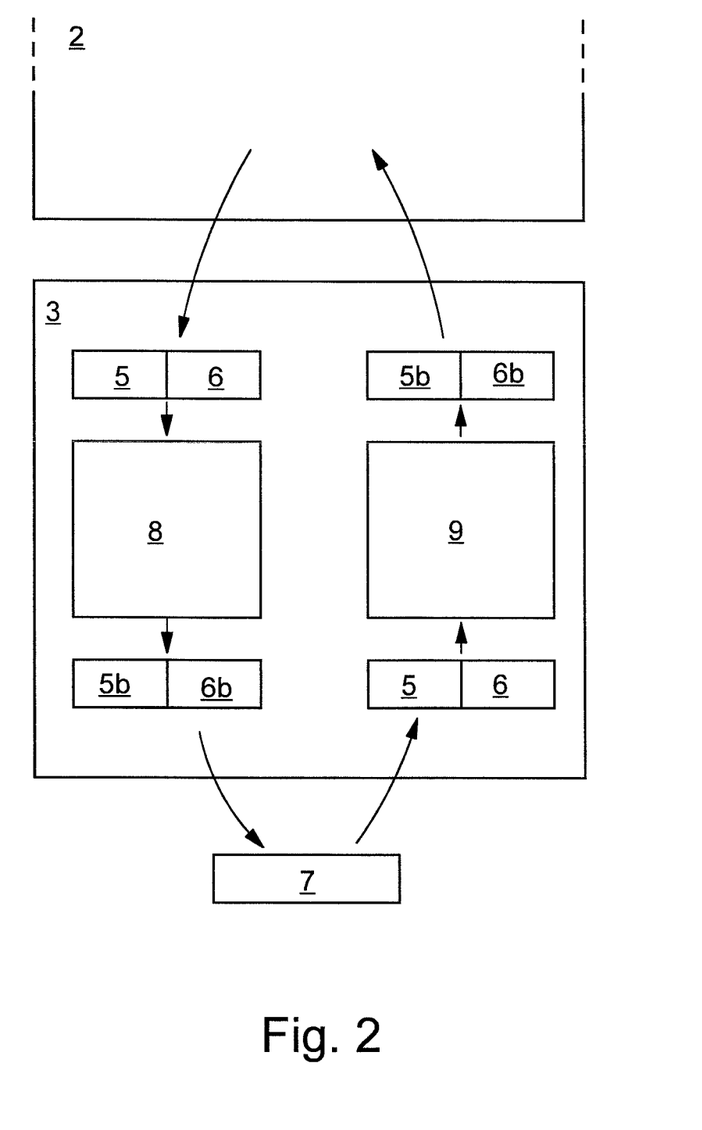
FIG. 2 shows a send manipulation layer and a receive manipulation layer within a second communication layer.

The operation of the method of the invention for manipulating the bus communication of control device 1 is shown in FIG. 2. In second communication layer 3, a send manipulation layer 8 is realized, which manipulates first protocol data unit 5 and/or an additional protocol data unit 6 derived from first protocol data unit 5 and the manipulated first protocol data unit 5b and/or the manipulated additional protocol data unit 6b are provided to second communication layer 3 for further processing. The send manipulation layer 8 is used here, for example, for intentional error injection and therefore for testing the bus communication. It is worth noting here that the bus hardware-independent first communication layer 2 is not changed by the method of the invention for manipulating the bus communication or does not need to be adjusted; particularly all protocol layers incorporated by the bus hardware-independent first communication layer 2, particularly communication services also located here, can be used as they are used in practice in the series control device.

Further, it is evident in FIG. 2 that within second communication layer 3 a receive manipulation layer 9 as well is realized, which manipulates additional protocol data unit 6 or first protocol data unit 5 derived from additional protocol data unit 6 and the obtained manipulated first protocol data unit 5b and/or manipulated additional protocol data unit 6b are provided to second communication layer 3 for further processing (receive direction).

Of course, not all protocol data units need to be manipulated by send manipulation layer 8 or by receive manipulation layer 9; if necessary, protocol data units can also pass by the manipulation layers, which is not shown here in detail.

Figure 3:
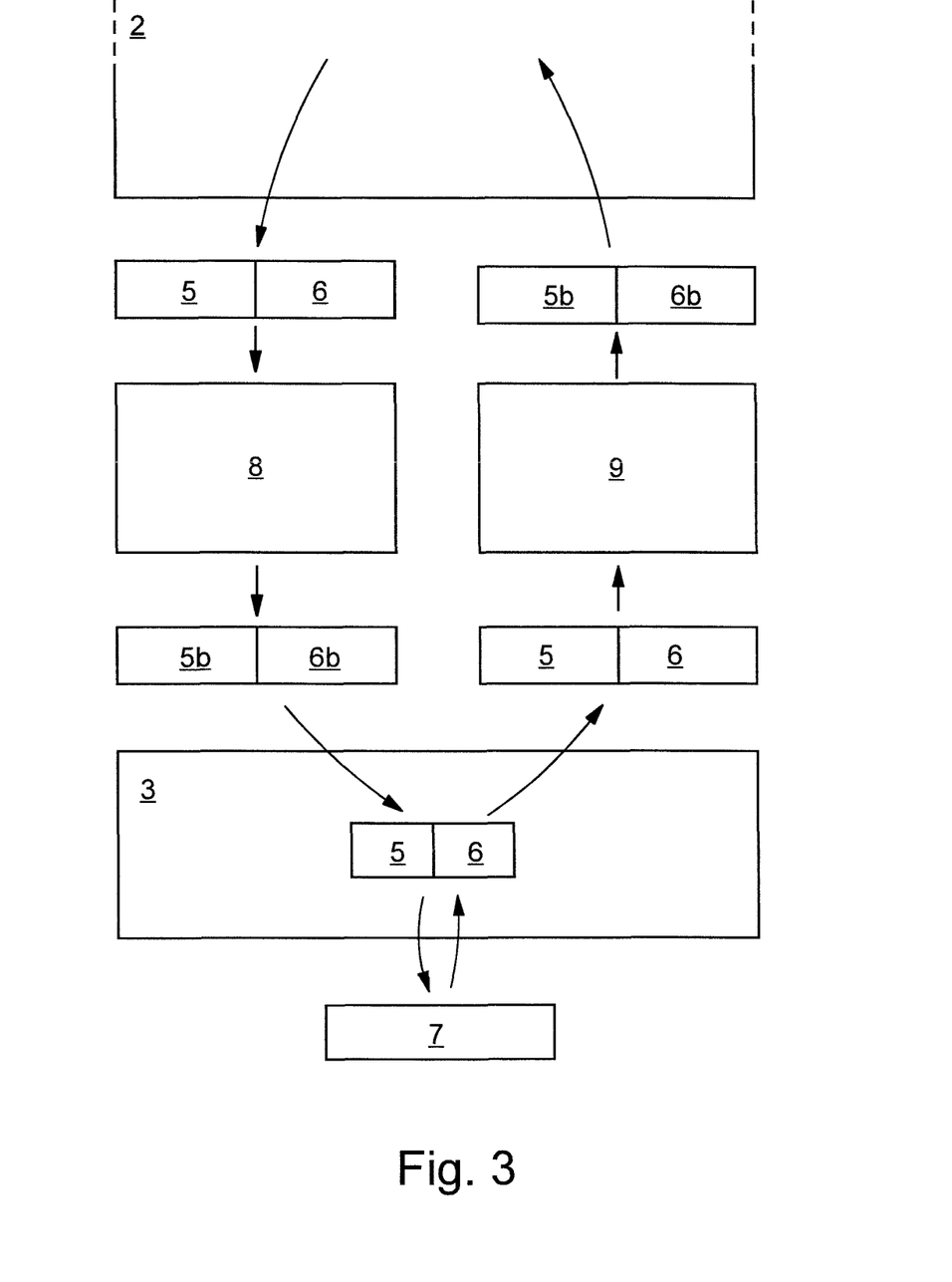
FIG. 3 shows a send manipulation layer and a receive manipulation layer between a bus hardware-independent first communication layer and a bus hardware-dependent second communication layer.

The method of the invention for manipulating the bus communication of a control device is also shown in FIG. 3, whereby in contrast to the exemplary embodiment according to FIG. 2 both send manipulation layer 8 and receive manipulation layer 9 are realized between first communication layer 2 and second communication layer 3. The result of each manipulation layer 8, 9 in each case is that the manipulated first protocol data unit 5b or the manipulated additional protocol data unit 6b is generated from first protocol data unit 5 or from additional protocol data unit 6 derived from first protocol data unit 5 by suitable manipulation. In the send direction, the manipulated first protocol data unit 5b or the manipulated additional protocol data unit 6b for second communication layer 3 functions like a first protocol data unit 5 or like additional protocol data unit 6 derived therefrom; this is not distinguishable for second communication layer 3.

Figure 4:
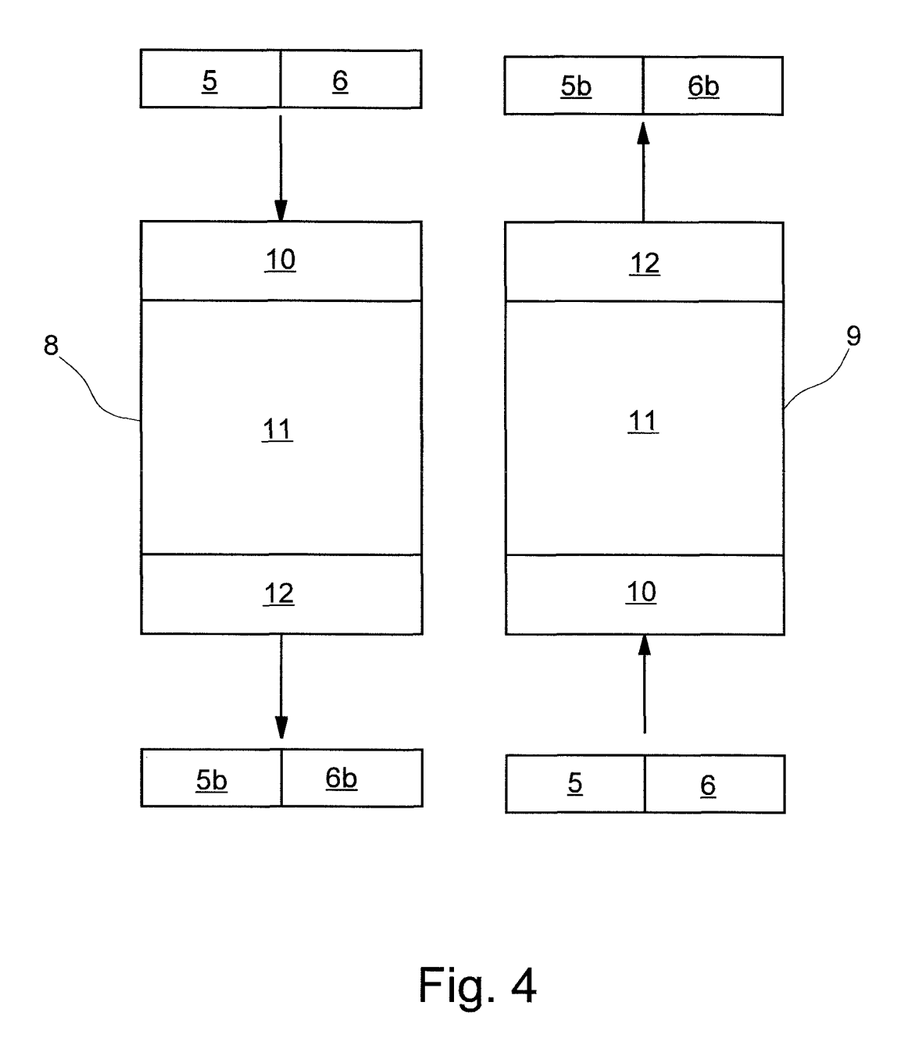
FIG. 4 shows schematically the structure of the send manipulation layer and the receive manipulation layer.

FIG. 4 shows the more precise process during the manipulation of the bus communication, on the one side for the send path and send manipulation layer 8 (on left), and on the other side for the receive path by means of receive manipulation layer 9 (on right). The send manipulation layer 8 manipulates first protocol data unit 5 or an additional protocol data unit 6 derived from first protocol data unit 5, in that first protocol data unit 5 or additional protocol data unit 6 is decoded 10, the obtained decoded information to be manipulated is manipulated 11, and the manipulated information is again encoded into a manipulated first protocol data unit 5b or into a manipulated additional protocol data unit 6b 12. Analogously, the manipulation also occurs in the receive direction; receive manipulation layer 9 there manipulates additional protocol data unit 6 or first protocol data unit 5 derived from additional protocol data unit 6, in that additional protocol data unit 6 or first protocol data unit 5 is decoded 10, the obtained decoded information to be manipulated is manipulated 11, and the manipulated information is again encoded to manipulated first protocol data unit 5b or to manipulated additional protocol data unit 6b 12. Of course, the steps described here for the send path and the receive path of decoding 10, manipulation 11, and encoding 12 can differ from one another, even if they are provided with the same reference characters here; of course, manipulation can also be undertaken only in the send path or also only in the receive path. As mentioned above, protocol data units can also be selectively passed by the manipulation layers.

Figure 5:
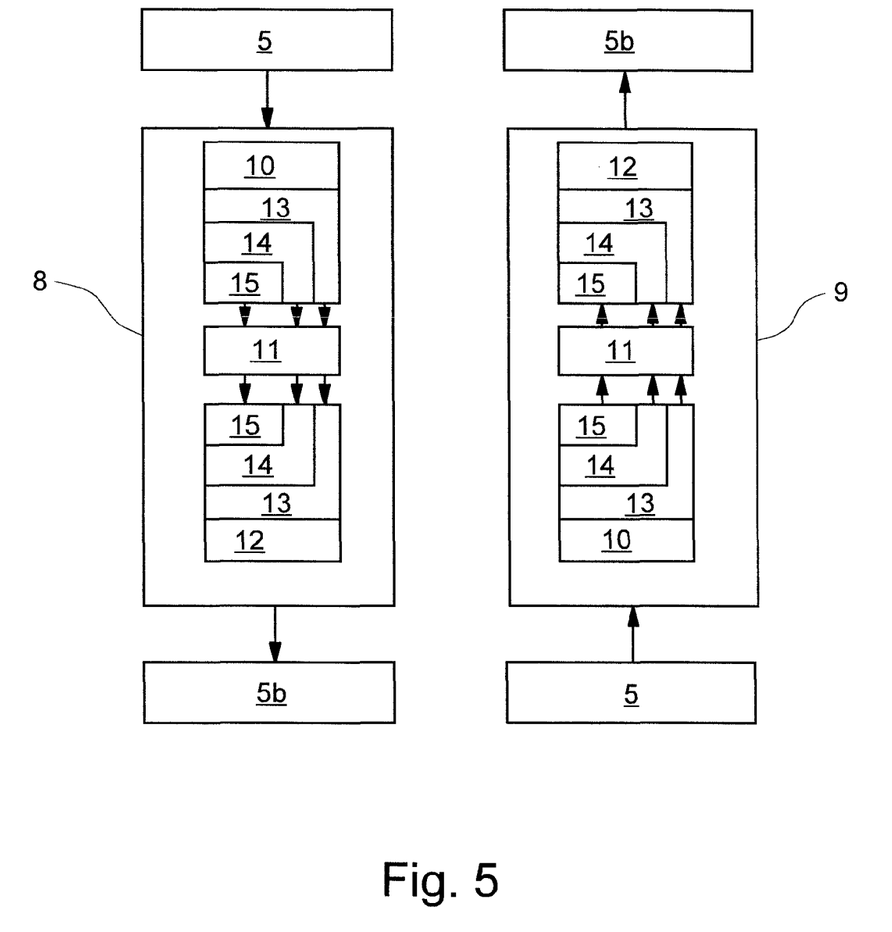
FIG. 5 shows a detail view of a possible operation of the send manipulation layer and the receive manipulation layer.

FIG. 5 explains the operation of send manipulation layer 8 and receive manipulation layer 9 as previously described with the use of FIG. 4. It is shown in a very compact manner in FIG. 5 that the information to be manipulated can occur at a different depth of the protocol and that the extent of the decoding 10, depending on the depth of the protocol stack where the manipulation is to occur, can also vary greatly. In the exemplary embodiment shown in FIG. 5, it is shown by way of example that the decoding 10 extends either to a network protocol layer 13, to an interaction protocol layer 14, or even to a signal level 15, whereby the manipulation 11 then occurs in the particular protocol layer. Conversely, the encoding 12 must then again proceed through all protocol layers, therefore from signal level 15 via interaction protocol layer 14 to network protocol layer 13. This applies to send manipulation layer 8 as well as to receive manipulation layer 9. If a manipulation is to occur only in network protocol layer 13, however, the decoding 10 need not occur in protocol layers 14 and 15; the decoding 10 of network protocol layer 13 is followed directly by manipulation 11 and the following encoding 12 in network protocol layer 13. In each of the protocol layers there exists then a unique protocol data unit, which can be the object of a manipulation 11, for the particular protocol layer.

The typical structure of a protocol stack underlying a bus communication to be manipulated is shown on of FIG. 6. In the example, the software architecture follows the modular and open structure according to the AUTOSAR standard. The bus hardware-independent first communication layer 2 thereby comprises application protocol layer 16, runtime environment 17, and bus hardware-independent communication services 18. Bus hardware-dependent communication layer 3, in contrast, comprises a hardware abstraction protocol layer 19 and a driver protocol layer 20. Within second communication layer 3, sub-communication layers 19 and 20 are preceded by a combined send and receive manipulation layer 8, 9. The send and receive manipulation layers 8, 9 in no way require a change or instrumentation of bus hardware-independent first communication layer 2, so that the described method for manipulating the bus communication of a control device makes it possible to use a communication code which is unique to the control device and is present in the shown example in protocol layer 18 with the communication services, during the simulation and testing of the control device communication. As also shown in FIGS. 1 to 3, the bus hardware-dependent bus information 7 is sent from or received by bus hardware-dependent second communication layer 3 depending on the communication direction.

The exemplary embodiment according to FIG. 7 is similar to the exemplary embodiment according to FIG. 6, with the difference that apart from the first send and receive manipulation layer 8, 9 now also an additional second send and receive manipulation layer 8, 9 is provided, namely, between protocol layers 19 and 20, whereby protocol layer 19 is also a hardware abstraction layer and protocol layer 20 is a hardware driver layer.

FIG. 8 shows the application in which the method for manipulating the bus communication of a control device 1 is carried out in series control device 1, whereby series control device 1 is connected via a bus 21 to other control devices and peripheral devices which are connected to bus 21 and of which only one additional control device 22 is illustrated. In control device 1a first bus hardware-independent communication layer and a bus hardware-dependent second communication layer are realized for the realization of the bus communication, whereby, moreover, a send and receive manipulation layer, which is used for the targeted error injection and thereby the testing of control device 1 and the entire network, is also realized between the two communication layers for manipulating the bus communication.

FIG. 9 shows the application of implementing the method for manipulating the bus communication on a series control device 1, whereby control device 1 is connected to a hardware-in-the-loop simulator 23, which has a suitable bus interface and in which within the scope of a restbus simulation the other participants 24a, 24b of the bus network are simulated. Optionally, in addition to series control device 1 and to control devices simulated by the hardware-in-the-loop simulator 23, other series control devices are connected to the bus, which is not shown here in detail.

In another application, not shown here in detail, also the control device, in which the method for manipulating the bus communication is implemented, is simulated with real-time-capable hardware; the method is therefore run on a virtual control device in real time. It is essential here as well that although in the last application example no control device hardware is present, nonetheless the bus hardware-independent first communication layer can be used as it will be used later in a series control device; in particular, the communication services can also be precisely tried out and tested that are part of the bus hardware-independent first communication layer.

In FIG. 10, finally the "offline" application is shown in which the afore-described method for manipulating the bus communication is operated in a non-real-time-capable PC 25. Control device 1, in which the method is run, is also simulated here, precisely like bus connection 21 to other participants in the communication, of which only the virtual control device 24 is shown.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manipulating a bus communication of a control device, the bus communication comprising at least one bus hardware-independent first communication layer and at least one bus hardware-dependent second communication layer, the method comprising:
    encoding, via the first communication layer, at least one piece of information in a first protocol data unit and transmitting the protocol data unit to the second communication layer and/or the first communication layer receives the first protocol data unit from the second communication layer and decodes the first information from the first protocol data unit;
    generating, via the second communication layer, bus hardware-dependent bus information from the first protocol data unit or from an additional protocol data unit derived from the first protocol data unit for transmission via the bus and/or the second communication layer generates the first protocol data unit or an additional protocol data unit from which the first protocol data unit is derived, at least from a bus hardware-dependent bus information; and
    manipulating, via at least one send manipulation layer realized between the first communication layer and the second communication layer, the first protocol data unit and/or at least one additional protocol data unit derived from the first protocol data unit;
    wherein the first communication layer is realized in software,
    the method further comprising:
    providing the manipulated first protocol data unit and/or the manipulated additional protocol data unit to the second communication layer for further processing; and
    manipulating, via at least one receive manipulation layer realized between the first communication layer and the second communication layer, the additional protocol data unit and/or the first protocol data unit derived from the additional protocol data unit and providing the manipulated additional protocol data unit and/or the manipulated first protocol data unit to the second communication layer for further processing.

* * * * *